United States Patent
Pisek et al.

(10) Patent No.: US 9,069,702 B2
(45) Date of Patent: Jun. 30, 2015

(54) REDUCING READ STARVATION

(76) Inventors: Todd Pisek, St. Paul, MN (US);
Matthew Dewey, Broomfield, CO (US)

( * ) Notice: Subject to any disclaimer, the term of this patent is extended or adjusted under 35 U.S.C. 154(b) by 645 days.

(21) Appl. No.: 13/463,430

(22) Filed: May 3, 2012

(65) Prior Publication Data

US 2013/0297898 A1 Nov. 7, 2013

(51) Int. Cl.
*G06F 12/00* (2006.01)
*G06F 12/12* (2006.01)
*G06F 3/06* (2006.01)
*G06F 12/02* (2006.01)
*G06F 5/06* (2006.01)

(52) U.S. Cl.
CPC ............ *G06F 12/122* (2013.01); *G06F 3/0656* (2013.01); *G06F 3/0659* (2013.01); *G06F 3/0641* (2013.01); *G06F 12/02* (2013.01); *G06F 12/126* (2013.01); *G06F 5/065* (2013.01); *G06F 12/123* (2013.01)

(58) Field of Classification Search
CPC ... G06F 3/0641; G06F 3/0656; G06F 3/0659; G06F 12/00; G06F 12/02; G06F 12/123; G06F 12/126; G06F 5/065
See application file for complete search history.

(56) References Cited

U.S. PATENT DOCUMENTS 8,204,871 B1 * 6/2012 Pawar et al. .................. 707/705

* cited by examiner

*Primary Examiner* — Shawn X Gu (57) ABSTRACT

Apparatus, methods, and other embodiments associated with reducing read starvation that is supported by a multi-purpose buffer managed by a least recently used (LRU) data structure are described. One example method includes changing how certain retired pages are added back into the LRU. The dual-purpose buffer may be used in data de-duplication to support satisfying ingest requests and to support satisfying read requests. The method may also include controlling the LRU to allocate active ingest pages and active read pages from the head of the LRU. The method may also include controlling the LRU to cause the active ingest page and the active read page to re-enter the LRU at the tail of the LRU. Unlike conventional approaches, the method may also include controlling the LRU to cause a retired ingest page to re-enter the LRU at a location other than the tail (e.g., head) of the LRU.

21 Claims, 9 Drawing Sheets

REDUCING READ STARVATION

BACKGROUND

Data de-duplication systems parse an incident data stream into blocks, compute an identifier (e.g., fingerprint) for a block, and selectively store unique blocks in a block repository. Data de-duplication systems also satisfy read requests that seek to read data from unique blocks in the block repository. Conventional data de-duplication apparatus and methods may use a dual purpose buffer to track buffer pages. The dual purpose buffer may be managed using a least recently used (LRU) data structure that can track pages that are used both for satisfying ingesting data actions and for satisfying read requests. Conventional data de-duplication apparatus and methods may prioritize processing ingest actions over satisfying read requests. Thus, conditions may arise where a read request may never be satisfied, or may be satisfied in an unacceptably long or undesirably long period of time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods address reducing read starvation for data de-duplication apparatus and methods that employ a least recently used (LRU) data structure to manage a dual purpose buffer that supports the de-duplication. More generally, example systems and methods describe a modified LRU to manage a dual purpose buffer. An LRU is a well-known data structure. Conventional data de-duplication apparatus and methods may use an LRU to track buffer pages that have been allocated for two separate purposes: ingest, and satisfying read requests. When ingest is prioritized over satisfying read requests, a condition may arise where read requests are not satisfied, or are satisfied after too long of a wait.

Figure 1:
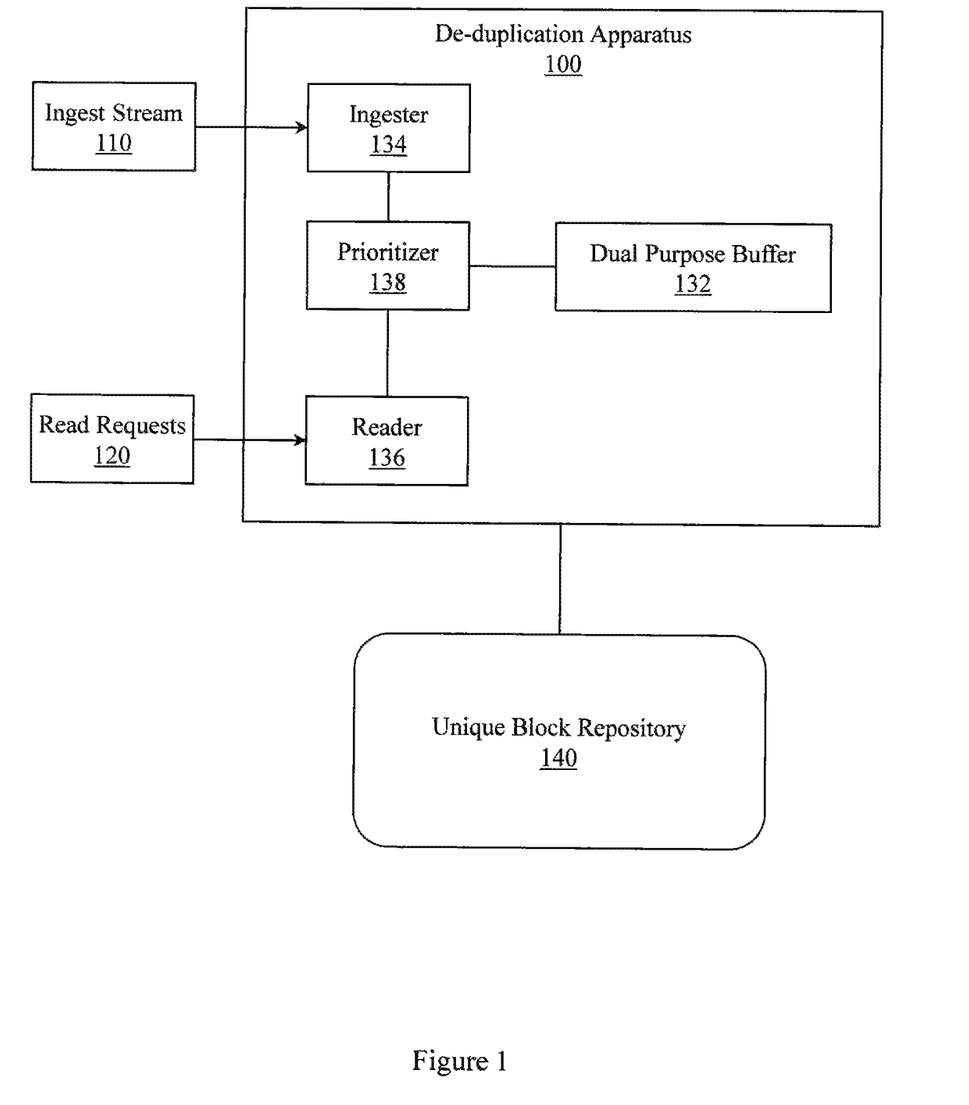
FIG. 1 illustrates an exam pie de-duplication apparatus configured with a dual-purpose buffer.

FIG. 1 illustrates a de-duplication apparatus 100 configured with an LRU 132 that manages buffer pages in a dual-purpose buffer that supports multiple de-duplication actions. The LRU 132 may store buffer pages but may more likely track buffer pages. The buffer pages may be used to support both an ingester 134 and a reader 136. The ingester 134 may be tasked with ingesting data from an ingest stream 110. Ingesting the ingest stream 110 may include, for example, chunking and hashing the ingest stream 110 into blocks, making a duplicate determination, and selectively storing unique blocks. When a duplicate block is encountered, the ingester 134 may selectively write the unique block to the unique block repository 140. The ingester may use pages that are tracked by the LRU 132. The reader 136 may be tasked with satisfying read requests 120. A read request 120 may seek to acquire data stored in a unique block that is stored in the unique block repository 140. The reader 136 may also use pages that are tracked by the LRU 132. Both the ingester 134 and the reader 136 may use buffer pages to temporarily store data.

Since both the ingester 134 and the reader 136 may use pages that are tracked by the LRU 132, a prioritizer 138 may control access to dual purpose buffer pages that will be tracked by the LRU 132. The prioritizer 138 may also control resources for completing tasks performed by the ingester 134 and the reader 136. Conventionally, prioritizer 138 may have been configured to give preference to tasks associated with the ingester 134 over tasks associated with the reader 136. In some situations this may have led to read requests 120 not being satisfied in an acceptable and/or desirable period of time. This delay may be referred to as "read starvation."

Figure 2:
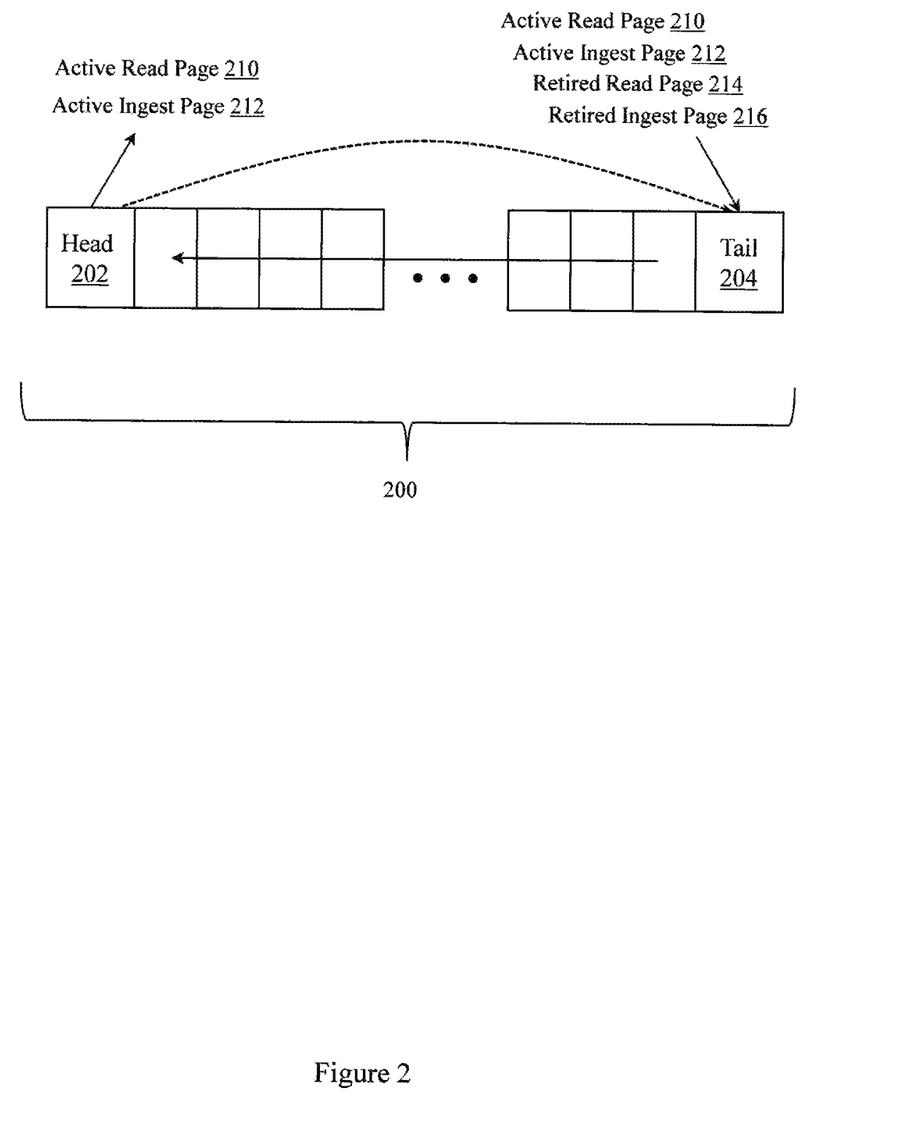
FIG. 2 illustrates an example least recently used (LRU) data structure involved in managing a dual-purpose buffer used to support data de-duplication.

FIG. 2 illustrates how read starvation may occur. FIG. 2 illustrates an LRU 200. The LRU 200 has a head, 202 and a tail 204. The item (e.g., buffer page) associated with the head 202 is the least recently used item tracked by or in the LRU 200. The item (e.g., buffer page) associated with the tail 204 is the most recently used item tracked by or in the LRU 200. One way to think about a page associated with the head 202 of LRU 200 is to visualize that page as the page that has not been used in the longest time. An LRU supports the design decision that the thing that has not been used in the longest time is the thing that should be used next. Similarly, a page associated with the tail 204 can be visualized as the page that has just been used. An LRU supports the design decision that the thing that was most recently used should not be used next. In fact, you should wait to use that most recently used item until after less recently used items have been used.

The LRU 200 may be used to manage a dual-purpose buffer that supports bath ingest and read operations. When an ingest operation needs a page, a page can be allocated from the head 202 and labeled as an active ingest page (e.g., active ingest page 212). Similarly, when a read request needs a page, a page can be allocated from the head 202 and labeled as an active read page (e.g., active read page 210). Since the active ingest page 212 has just been used, it would, by definition, be the most recently used page and therefore would normally become associated with the tail 204. Similarly, an active read page 210 would also, by definition, be the most recently used page and would normally be associated with the tail 204. As a more recently used item is associated with the tail 204, the previously most recently used item, and all other items tracked by the LRU, are shuffled forwards towards the head. As more and more items are associated with the tail 204, eventually an item that had been associated with the tail 204 will be pushed all the way to the head 202, where it can be re-allocated.

When active ingest page 212 is retired, it is labeled as a retired ingest page (e.g., retired ingest page 216) and becomes, by definition, the most recently used page. The retired ingest page 216 is, therefore, associated with the tail 204. Similarly, when active read page 210 is retired, it is labeled as a retired read page (e.g., retired read page 214) and becomes, by definition, the most recently used page. The retired read page 214 is, therefore, associated with the tail 204. Once again, as items are associated with the tail 204, they force other items towards the head 202.

To summarize, the head 202 of LRU 200 can be used to locate a page that can be allocated to become an active read page 210 or an active ingest page 212. When a page is used as either an active read page 210 or an active ingest page 212 that page is then associated with the tail 204 of LRU 200. This pushes items that entered the LRU at the tail 204 towards the head 202. As pages are retired, they also re-enter the LRU 200 at the tail 204. For example, retired read page 214 and retired ingest page 216 re-enter the LRU 200 at tail 204.

When ingest is prioritized over read, it is possible that an active read page 210 can enter the LRU 200 at the tail 204 and then be pushed towards the head 202 by the entry at the tail of active ingest pages, retired ingest pages, other active read pages, and retired read pages. An active read page may continue to be pushed toward the head 202 before being retired. In some cases the active read page 210 can be pushed all the way to the head 202 until it is re-used (likely to satisfy ingest) before the read request to which it was allocated is ever satisfied. This creates read starvation.

Figure 3:
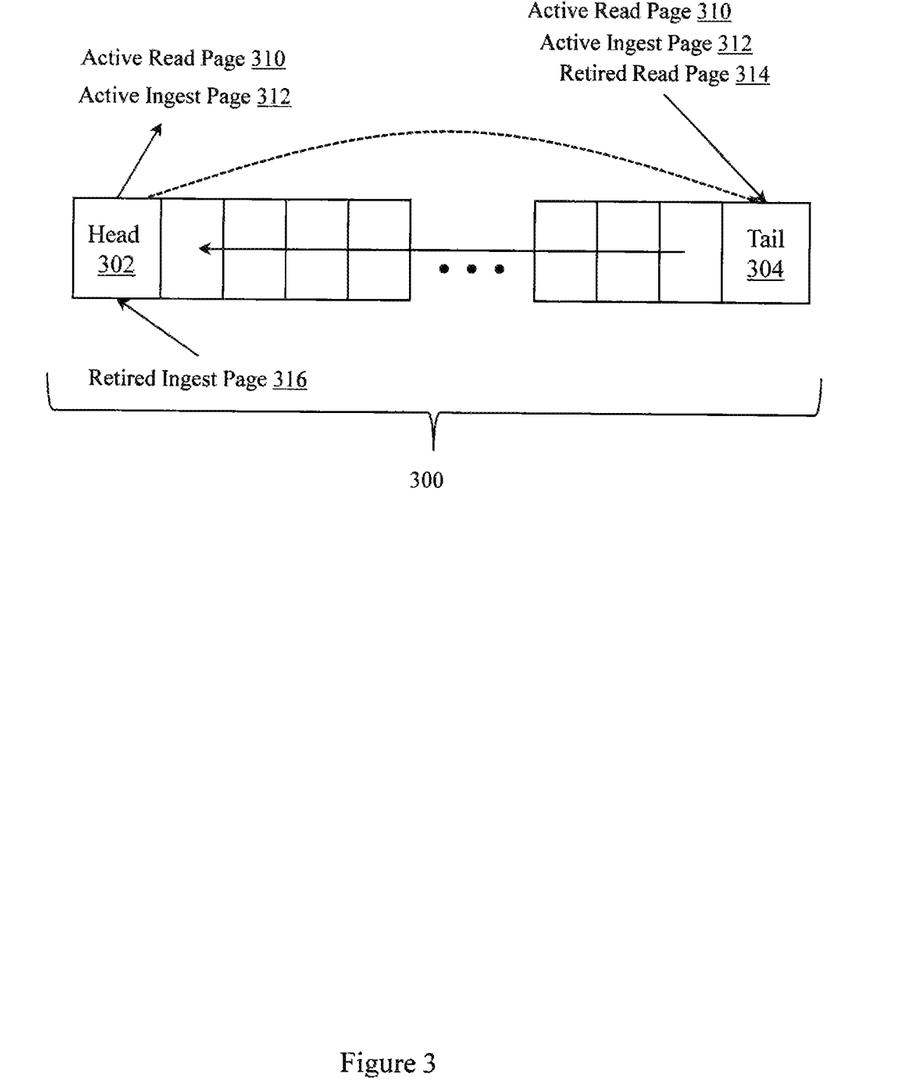
FIG. 3 illustrates an example LRU data structure.

Figure three illustrates an LRU 300 that operates differently than LRU 200 (FIG. 2). LRU 300 operates to support one embodiment, of the example apparatus and methods described herein. LRU 300 includes a head 302 and a tail 304. Active read pages (e.g., active read page 310) and active ingest pages (e.g., ingest page 312) may be allocated from the head 302. Active read page 310 and active ingest page 312 may then re-enter the LRU 300 via tail 304. Retired read pages (e.g., retired read page 314) may also re-enter LRU 300 via tail 304. However, a retired ingest page (e.g., retired ingest page 316) may re-enter the LRU 300 via the head 302 rather than via the tail 304.

Recall that items that re-enter the LRU 300 via tail 304 push other items already in the LRU 300 towards the head 302. Recall also that supporting ingest may be prioritized over supporting reading, and thus active read pages may be pushed towards the head 302 by retired read pages, by active read pages, and by active ingest pages. Recall also that if an active read page reaches the head 302 and is reallocated that read starvation can occur. Controlling retired ingest page 316 to re-enter the LRU 300 at the head 302 does not push any items in the LRU towards the head 302 and thus may reduce the likelihood that read starvation will occur.

Even though retired ingest page 316 may be, by definition, the most recently used item, it is not inserted at the tail 304, where the most recently used item is inserted. Instead, it is inserted at the head 302. A retired ingest page 316 is a good candidate for insertion at the head 302 because its task is completed. Other pages in the LRU 300 may be active pages that, in some cases, it is desirable to not advance towards the head 302 by a retired page.

Figure 4:
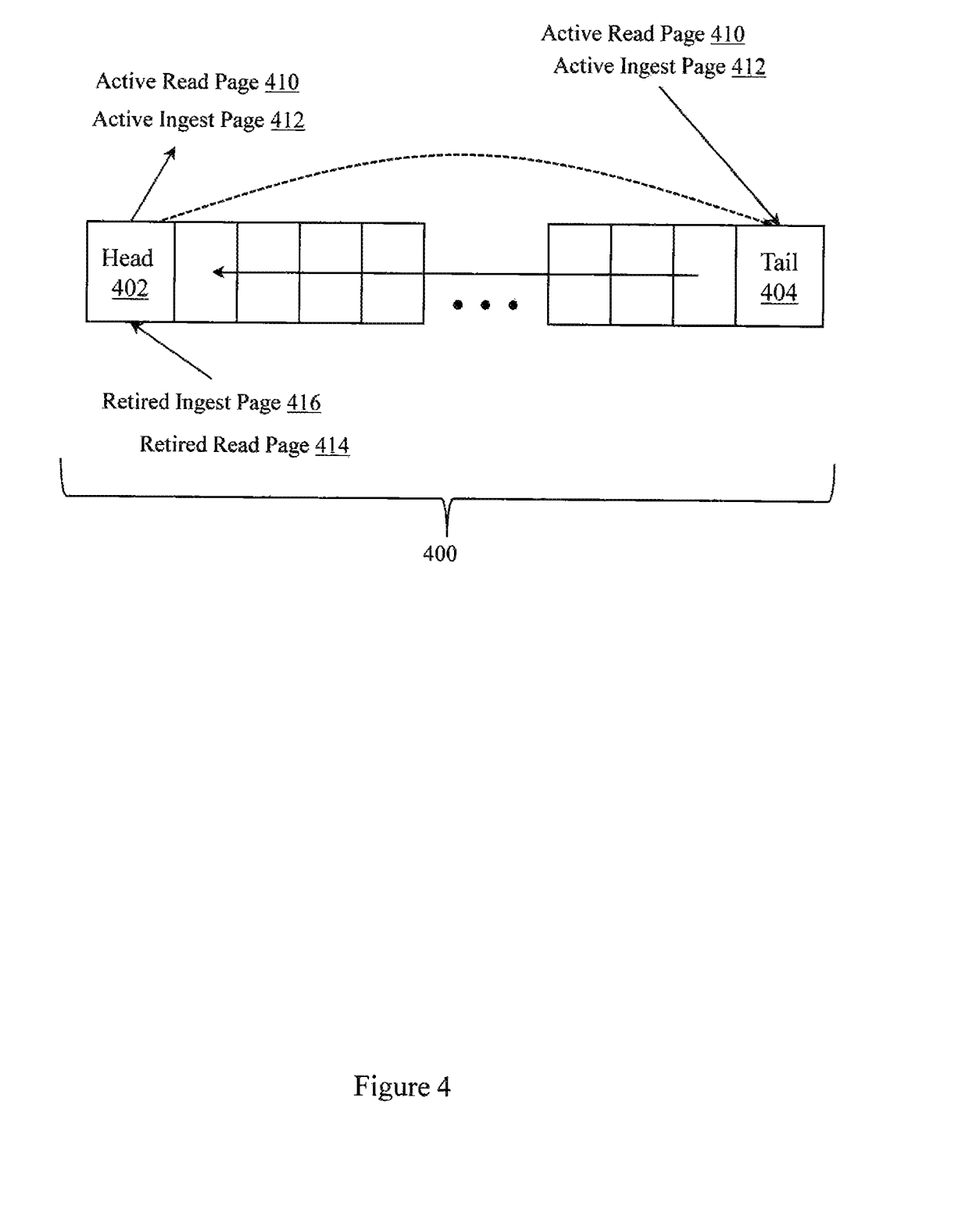
FIG. 4 illustrates an example LRU data structure.

FIG. 4 illustrates another example LRU 400 that supports different example apparatus and methods described herein. LRU 400 has a head 402 from which an active read page 410 and an active ingest page 412 can be allocated. Since they are now the most recently used pages, active read page 410 and active ingest page 412 may re-enter LRU 400 at the tail 404 as the most recently used pages. However, unlike conventional systems, a retired read page 414 and a retired ingest page 416 may re-enter LRU 400 at the head 402 instead of at the tail 404. In this embodiment, active pages will be pushed toward the head 402 of the LRU 400 by the entry of other active pages into the LRU 400 at the tail 404. However, active pages will not be pushed toward the head 402 of the LRU 400 by the entry of retired pages because retired pages will re-enter the LRU at the head 402. One skilled in the art will appreciate that different types and/or combinations of retired pages may be controlled to re-enter an LRU at its head under different conditions.

Figure 5:
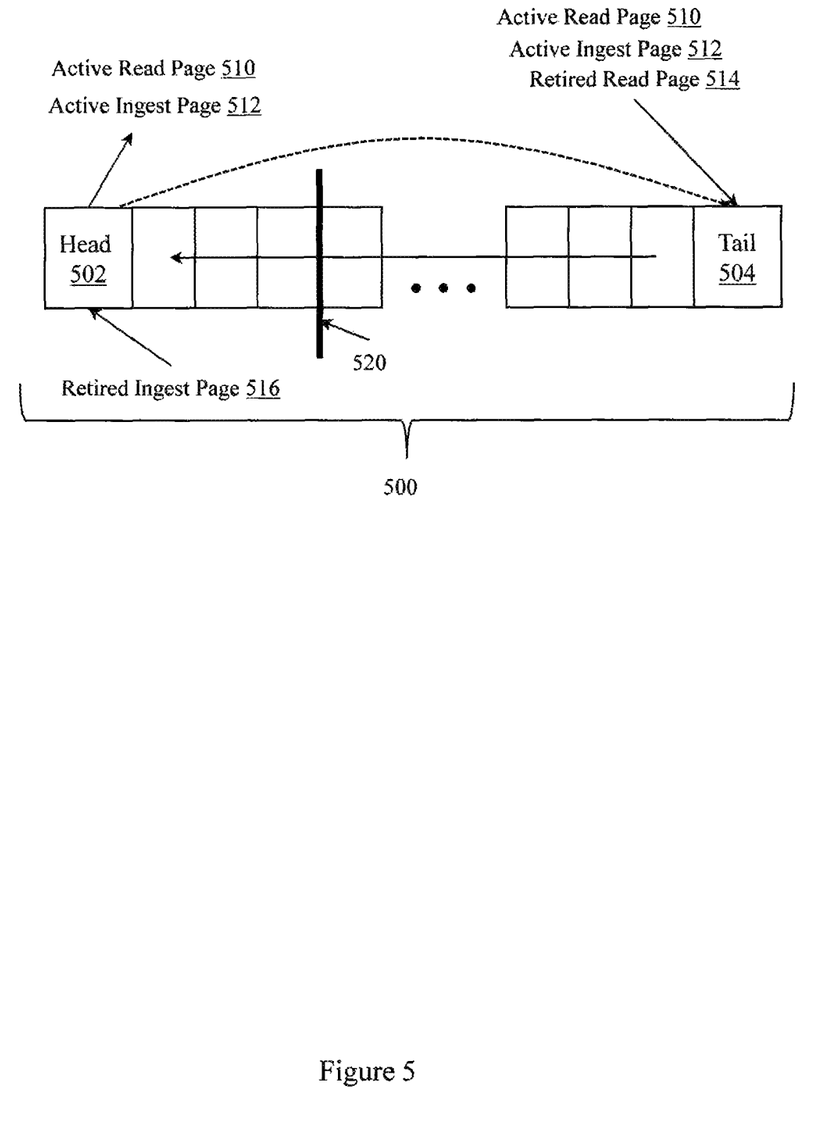
FIG. 5 illustrates an example LRU data structure.

FIG. 5 illustrates another embodiment of a retired-page head-entry LRU 500. LRU 500 has a head 502 from which an active read page 510 and an active ingest page 512 can be allocated. LRU 500 also has a tail 504 where an active read page 510, an active ingest page 512, and a retired read page 514 may re-enter the LRU 500. As items re-enter the LRU 500 at the tail 504 they push other items in the LRU 500 towards the head 502. LRU 500 is also configured with a threshold 520.

In one embodiment, data may be kept to track the number of active read pages that cross threshold 520 in a period of time. This data can then be used to control the priority of ingest over read. For example, if less than a threshold number of active read pages cross threshold 520 in a period of time, then the priority between ingest and read may be appropriate and no changes to priority will be made. However, if more than a threshold number of active read pages cross threshold 520 in a period of time, then the priority between ingest and read may be inappropriate and priority will be changed. In one embodiment, the priority can be dynamically changed in real time based on the number of active read pages that cross threshold 520 in a period of time. The priority may be changed in favor of ingest or in favor of satisfying read requests based on how many active read pages cross threshold 520. Example apparatus and methods are described below.

The following includes definitions of selected terms employed herein. The definitions include various examples and/or forms of components that fall within the scope of a term and that may be used for implementation. The examples are not intended to be limiting. Both singular and plural forms of terms may be within the definitions.

ASIC: application specific integrated circuit.
CD: compact disk.
CD-R: CD recordable.
CD-RW: CD rewriteable.
DVD: digital versatile disk and/or digital video disk.
I/O: input/output
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.
WAN: wide area network.
PPP: Point-to-Point protocol References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Figure 6:
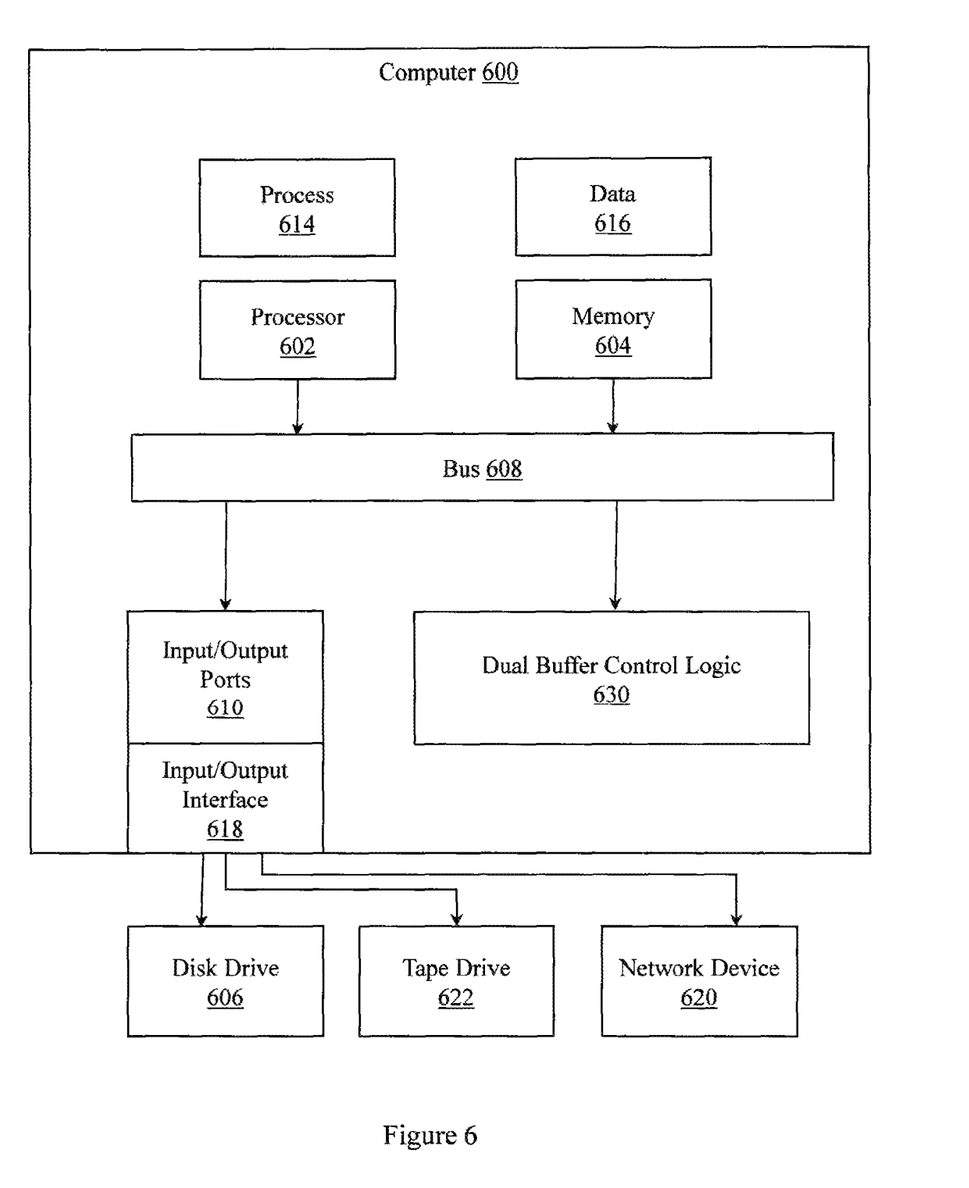
FIG. 6 illustrates an example computing environment in which example apparatus, systems, methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a dual buffer control logic 630 configured to facilitate reducing read starvation in de-duplication that is supported by an LRU controlled dual purpose buffer. More generally, the computer 600 may include a dual buffer control logic 630 configured to facilitate reducing read starvation in a storage system (e.g., block storage, file storage, network attached storage (NAS)) that is supported by an LRU controlled dual purpose buffer. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for controlling an ingest process. The ingest process may be, for example, an ingest performed in data de-duplication. The ingest process may have a first priority. Logic 630 may also provide means (e.g., hardware, software, firmware) for controlling a read process. The read process may be, for example, a read performed in data de-duplication. The read process may have a second priority different from the first priority. Logic 630 may also provide means (e.g., hardware, software, firmware) for selectively controlling a re-entry point of a buffer page into an LRU data structure. The re-entry point may be determined as a function of a status of the buffer page. The choices for re-entry can include the head of the LRU and the tail of the LRU. Selectively controlling the re-entry point for certain types of pages (e.g., retired ingest pages, retired read pages), facilitates mitigating or even eliminating read starvation by preventing the unnecessary advance of active pages towards the head of the LRU.

A de-duplication apparatus or process may experience different conditions at different times. Similarly, other apparatus that rely on an LRU to support a dual buffer may experience different conditions at different times. For example, at some times the apparatus or process may be dealing primarily with data ingest while at other times the apparatus or process may be dealing primarily with read requests. Different conditions may produce different mixtures of ingest requests and read requests. As noted herein, data de-duplication systems may be configurable with respect to the priority given to satisfying ingest requests over read requests. Thus, in one example, logic 630 may also provide means (e.g., hardware, software, firmware) for selectively controlling a priority between the ingest process and the read process in response to detecting an advancement of an active read page beyond a location in the LRU. In different examples the priority may be increased or decreased based on the number(s) of pages that advance beyond one or more boundaries in one or more periods of time.

The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory and/or non-volatile memory. Non-volatile memory may include, for example, ROM, PROM, and other non-volatile memory. Volatile memory may include, for example, RAM, SRAM, DRAM, and other volatile memory.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and other disks. Furthermore, the disk 606 may be a CD-ROM drive, a CD-R drive, a CD-RW drive, a DVD ROM drive, a Blu-Ray drive, an HD-DVD drive, and other drives. The memory 604 may store a process 614, data 616, and other items. The disk 606 and/or the memory 604 may store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, or other devices. The input/output ports 610 may include, for example, serial ports, parallel ports, USB ports, and other ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Figure 7:
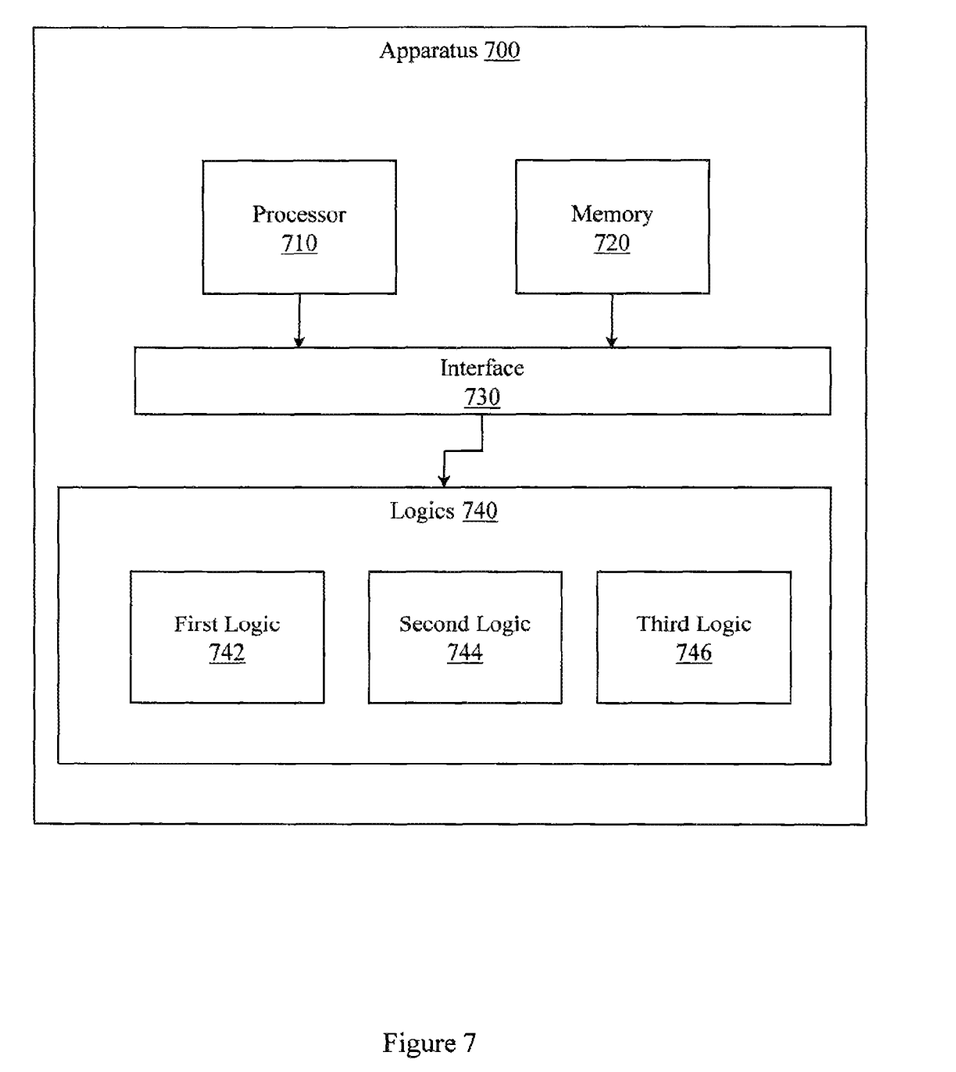
FIG. 7 illustrates an example apparatus associated with reducing read starvation in data de-duplication that uses an LRU data structure to manage a dual purpose buffer.

FIG. 7 illustrates an apparatus 700 for reducing read starvation in de-duplication that is supported by a dual purpose buffer that is managed by an LRU. More generally, apparatus 700 may reduce read starvation in applications that are supported by a dual purpose buffer managed by an LRU. Apparatus 700 includes a processor 710, a memory 720, a set 740 of logics, and an interface 730 to connect the processor 710, the memory 720, and the set 740 of logics. In one embodiment, apparatus 700 may be a special purpose computer that is created as a result of programming a general purpose computer. In another embodiment, apparatus 700 may include special purpose circuits that are added to a general purpose computer to produce a special purpose computer.

In one example, the memory 720 may be configured with an LRU data structure to manage buffer pages in the dual purpose buffer that supports multiple data de-duplication actions. In different examples the LRU may manage the buffer pages either directly or indirectly. Direct management may occur when the actual buffer pages are stored in the LRU. Indirect management may occur when information about actual buffer pages is stored in the LRU.

In one embodiment, the set 740 of logics includes a first logic 742, a second logic 744, and a third logic 746. In one embodiment, the first logic 742 is configured to support a first data de-duplication action. The first de-duplication action may be, for example, an ingest action. The ingest action may be associated with parsing a data stream into blocks, computing an identifier for a block, determining whether the block is a unique block, selectively writing a unique block to a block repository, and other actions.

In one embodiment, the second logic 744 is configured to support a second data de-duplication action. The second de-duplication action may be, for example, a read request action. The read request action may be associated with, for example, reading data from a unique block in the block repository.

In one embodiment, the third logic 746 is configured to support both the first data de-duplication action and the second data-duplication action by controlling the allocation of a buffer page via the LRU and by selectively controlling the buffer page to re-enter the LRU at one of, a tail of the LRU, and a head of the LRU. In one embodiment, the third logic 746 is configured to control a retired ingest page to re-enter the LRU at the head of the LRU. In another embodiment, the third logic 746 may also be configured to control a retired read page to re-enter the LRU at the head of the LRU. Controlling retired pages to re-enter the LRU at its head instead of at its tail facilitates slowing the advance of active read pages towards the head of the LRU where they may be re-tasked, which may lead to read starvation.

In one embodiment, the third logic 746 is configured to acquire data concerning the position of a type of tracked buffer page in the LRU. The type of tracked buffer page may be, for example, an active page associated with satisfying a read request. With this data concerning a tracked buffer page available, the third logic 746 may also be configured to selectively control allocation of a resource between the first data de-duplication action and the second data de-duplication action. The control may be made as a function of the data concerning the position of the tracked buffer page. The control may include, for example, making it more or less likely that an ingest request will be satisfied before a read request will be satisfied.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
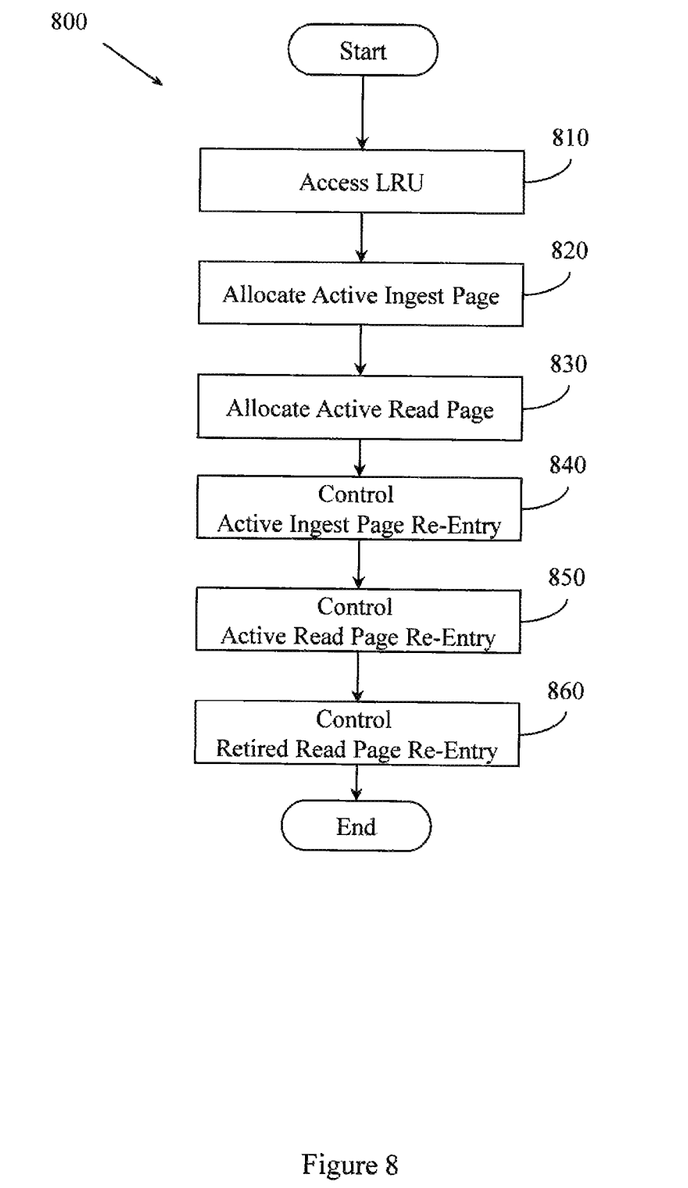
FIG. 8 illustrates an example method associated with reducing read starvation in data de-duplication that uses an LRU data structure to manage a dual purpose buffer.

FIG. 8 illustrates a method 800 associated with reducing read starvation in de-duplication that is supported by a dual purpose buffer whose allocation and re-entry is managed by an LRU. More generally, method 800 reduces read starvation in applications supported by a dual purpose buffer whose allocation and re-entry is managed by an LRU. Method 800 controls how the LRU associated with the dual purpose buffer operates. In different embodiments the LRU may track buffer pages or may store buffer pages.

Method 800 may include, at 810, accessing an LRU data structure that manages buffer pages for a dual-purpose buffer. The dual-purpose buffer and the LRU may be used in data de-duplication by a de-duplication apparatus, a de-duplication process, or other de-duplication entity. The LRU and the buffer may support satisfying both ingest requests and read requests. Ingest requests may be associated with parsing an input stream into blocks. Ingest requests may also be associated with identifying unique blocks. Read requests may be associated with reading data from unique blocks stored in a block repository. The LRU data structure may have both a head and a tail. Active pages may be allocated using the head of the LRU and then may re-enter the LRU at the tail.

Method 800 may include, at 820, controlling the LRU to allocate an active ingest page from the head of the LRU to support satisfying an ingest request and may include, at 830, controlling the LRU to allocate an active read page from the head of the LRU to support satisfying a read request. In different embodiments the LRU may store information about buffer pages or may store buffer pages. Thus allocating an active ingest page may include manipulating data in the LRU or may include manipulating a page in the LRU.

Method 800 may also include, at 840, controlling the LRU to cause the active ingest page to re-enter the LRU at the tail of the LRU and, at 850, controlling the LRU to cause the active read page to re-enter the LRU at the tail of the LRU. Once again, since the LRU may store either actual buffer pages or may store information about buffer pages, controlling the re-entry of a buffer page may include manipulating data in the LRU or may include manipulating a page in the LRU.

An active ingest page becomes a retired ingest page upon completing its support of satisfying the ingest request. Unlike conventional approaches to controlling an LRU, method 800 may include, at 860, controlling the LRU to cause a retired ingest page to re-enter the LRU at the head of the LRU. By having the retired ingest page re-enter the LRU at the head of the LRU instead of at the tail of the LRU, active read pages will not be unnecessarily advanced towards the head of the LRU. Preventing the unnecessary advancement of an active read page towards the head of the LRU can delay and may even prevent read starvation.

In one embodiment, method 800 may also include controlling the LRU to cause a retired read page to re-enter the LRU at the head of the LRU. An active read page becomes a retired read page upon completing its support of satisfying the read request.

In one example, a method may be implemented as computer executable instructions. Thus, in one example, a non-transitory computer-readable medium may store computer executable instructions that if executed by a machine (e.g., processor) cause the machine to perform method 800. While executable instructions associated with method 800 are described as being stored on a computer-readable medium, it is to be appreciated that executable instructions associated with other example methods described herein may also be stored on a computer-readable medium.

Figure 9:
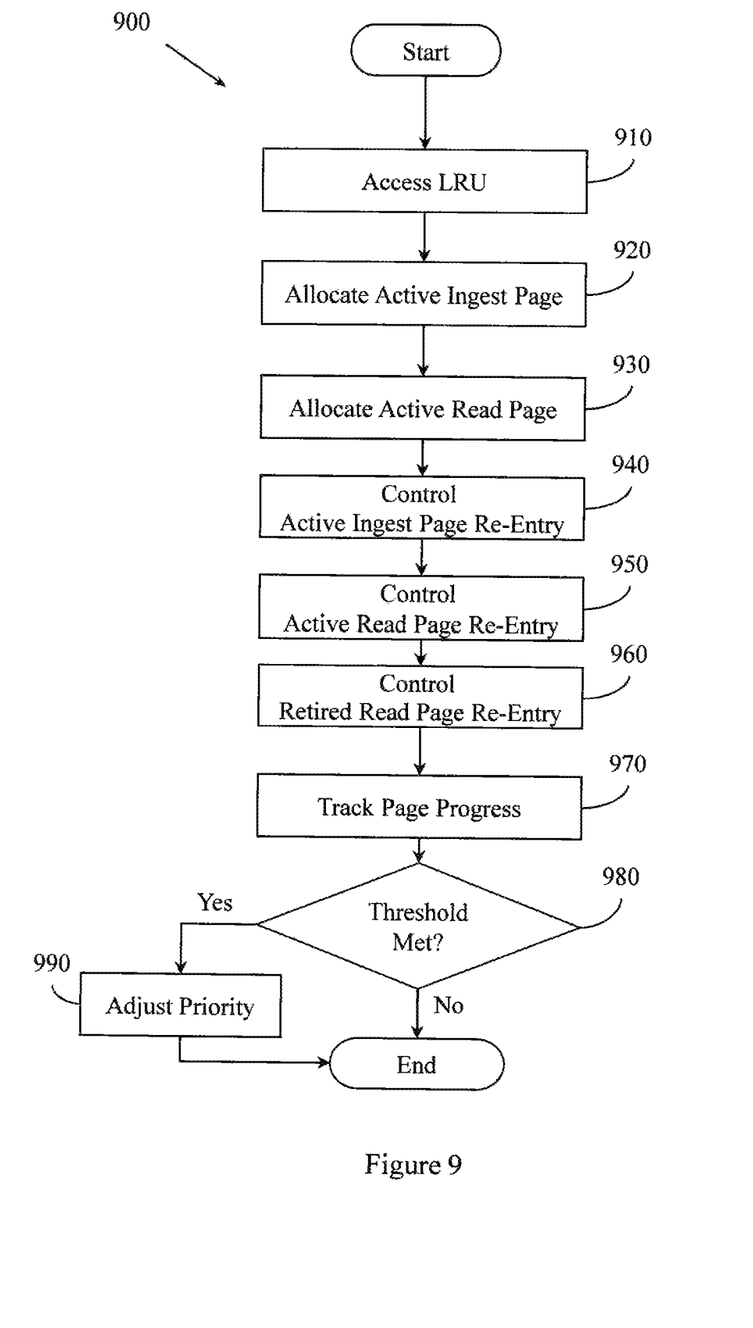
FIG. 9 illustrates an example method associated with reducing read starvation in data de-duplication that uses an LRU data structure to manage a dual purpose buffer.

FIG. 9 illustrates a method 900 associated with reducing read starvation. Method 900 includes several actions similar to those described in connection with method 800 (FIG. 8). For example, method 900 includes accessing an LRU at 910, allocating an active ingest page at 920, allocating an, active read page at 930, controlling active ingest page re-entry at 940, controlling active read page re-entry at 950, and controlling re-entry of retired pages at 960. One skilled in the art will appreciate that allocations and re-entry may occur at different times, at different locations (e.g., ahead of further advanced read page), and in different orders.

Method 900 also includes, at 970, tracking the progress of a page through the LRU. In one example, tracking the progress of a page through the LRU may include manipulating a tracking data that tracks a number of active read pages that cross a boundary in the LRU. In another example, the action at 970 may include manipulating (e.g., establishing, altering, tracking) data that tracks the number and types of pages that cross one or more boundaries in the LRU during different periods of time. The boundaries may be positioned relative to the head of the LRU to identify situations where it may be appropriate to alter the priority of handling ingest requests over read requests. For example, if too many active read requests are progressing towards the head of the LRU, then priorities may be altered so that more read requests are satisfied. In another example, if very few active read requests are progressing towards the head of the LRU, then priorities may be altered so that more ingest requests are satisfied. While a threshold is described, in one embodiment data may be maintained for multiple thresholds.

With the tracking data available, method 900 may include, at 980, making a determination concerning whether a threshold number of a certain type of pages have crossed the boundary. This determination facilitates selectively controlling the de-duplication apparatus to alter a priority between satisfying ingest requests and satisfying read requests. The determination may be based, at least in part, on the tracking data.

If the determination at 980 is no, then processing may conclude. But if the determination at 980 is yes, that more than a threshold number of pages of a certain type have been encountered, then processing may proceed at 990. Method 900 may include, at 990, selectively controlling the de-duplication apparatus to alter a priority between satisfying ingest requests and satisfying read requests based, at least in part, on the tracking data. Thus, method 900 may include, at 990, selectively controlling the de-duplication apparatus to increase or to decrease the priority of satisfying ingest requests over satisfying read requests based, at least in part, on the tracking data.

While FIG. 9 illustrates various actions occurring in serial, it is to be appreciated that various actions illustrated in FIG. 9 could occur substantially in parallel. By way of illustration, a first process could handle allocation and re-entry of active ingest pages, a second process could handle allocation and re-entry of active read pages, and a third process could handle re-entry of retired pages. While three processes are described, it is to be appreciated that a greater and/or lesser number of processes could be employed and that lightweight processes, regular processes, threads, and other approaches could be employed.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, MBB, AABBC, AABBCC and other combinations (e.g., the data store may store only A, only B, only C, A&B, A&C, B&C, A&B&C, A&A&A, A&A&B, A&A&B&B, A&A&B&B&C, A&A&B&B&C&C, and other combinations). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. A non-transitory computer-readable medium storing computer-executable instructions that when executed by a computer cause the computer to perform a method, the method comprising:
   accessing a least-recently-used (LRU) data structure associated with a dual-purpose buffer to support satisfying ingest requests and to support satisfying read requests, the LRU data structure having a head and a tail;
   controlling the LRU data structure to allocate an active ingest page from the head of the LRU data structure to support satisfying a particular ingest request;
   controlling the LRU data structure to allocate an active read page from the head of the LRU data structure to support satisfying a particular read request;
   controlling the LRU data structure to cause the active ingest page to re-enter the LRU data structure at the tail of the LRU data structure;
   controlling the LRU data structure to cause the active read page to re-enter the LRU data structure at the tail of the LRU data structure; and
   controlling the LRU data structure to cause a retired ingest page to re-enter the LRU data structure at the head of the LRU data structure, where the active ingest page becomes the retired ingest page upon completing support of satisfying the particular ingest request.

2. The non-transitory computer-readable medium of claim 1, the method comprising controlling the LRU data structure to cause a retired read page to re-enter the LRU data structure at the head of the LRU data structure, where the active read page becomes the retired read page upon completing support of satisfying the particular read request.

3. The non-transitory computer-readable medium of claim 1, the method comprising manipulating a tracking data that tracks a number of active read pages that cross a boundary in the LRU data structure.

4. The non-transitory computer-readable medium of claim 3, the method comprising selectively altering a priority between satisfying ingest requests and satisfying read requests based, at least in part, on the tracking data.

5. The non-transitory computer-readable medium of claim 4, the method comprising selectively increasing a priority of satisfying ingest requests over satisfying read requests based, at least in part, on the tracking data.

6. The non-transitory computer-readable medium of claim 4, the method comprising selectively decreasing a priority of satisfying ingest requests over satisfying read requests based, at least in part, on the tracking data.

7. The non-transitory computer-readable medium of claim 2, the method comprising manipulating a tracking data that tracks a number of active read pages that that cross a boundary in the LRU data structure.

8. The non-transitory computer-readable medium of claim 7, the method comprising selectively altering a priority between satisfying ingest requests and satisfying read requests based, at least in part, on the tracking data.

9. The non-transitory computer-readable medium of claim 8, the method comprising selectively increasing a priority of satisfying ingest requests over satisfying read requests based, at least in part, on the tracking data.

10. The non-transitory computer-readable medium of claim 8, the method comprising selectively decreasing a priority of satisfying ingest requests over satisfying read requests based, at least in part, on the tracking data.

11. The non-transitory computer-readable medium of claim 1, where the least-recently-used (LRU) data structure is associated with a dual-purpose buffer to support satisfying ingest requests and to support satisfying read requests for a data de-duplication process.

12. An apparatus, comprising:
   a processor;
   a memory configured with a least recently used (LRU) data structure to manage buffer pages in a multi-purpose buffer used to support data de-duplication;
   a set of logics; and
   an interface to connect the processor, the memory, and the set of logics, the set of logics comprising:
      a first logic that supports a first data de-duplication action;

a second logic that supports a second data de-duplication action; and a third logic that supports both the first data de-duplication action and the second data de-duplication action by controlling an allocation of a particular buffer page via the LRU data structure and by selectively controlling the particular buffer page to re-enter the LRU data structure at one of, a tail of the LRU data structure, a head of the LRU data structure, and at a selected location in the LRU data structure.

13. The apparatus of claim 12, the first de-duplication action being an ingest action.

14. The apparatus of claim 13, the second de-duplication action being a read request action.

15. The apparatus of claim 14, where the third logic controls a retired ingest page to re-enter the LRU data structure at the head of the LRU data structure.

16. The apparatus of claim 15, where the third logic acquires data concerning a position of a tracked buffer page in the LRU data structure.

17. The apparatus of claim 16, where the third selectively controls allocation of a resource between the first data de-duplication action and the second data de-duplication action based, at least in part, on the data concerning the position of the tracked buffer page.

18. The apparatus of claim 14, where the third logic controls a retired read page to re-enter the LRU data structure at the head of the LRU data structure.

19. A system, comprising:
means for controlling an ingest process;
means for controlling a read process; and
means for selectively controlling a re-entry point of a buffer page into a least recently used (LRU) data structure associated with a dual-purpose buffer that supports the ingest process and the read process, where the re-entry point is determined as a function of a status of the buffer page, where the means for selectively controlling a re-entry point include hardware, the means for controlling a read process include hardware, and the means for controlling an ingest process include hardware.

20. The system of claim 19, comprising means for selectively controlling a priority between the ingest process and the read process in response to detecting an advancement of an active read page beyond a location in the LRU data structure, where the means for selectively controlling a priority include hardware.

21. The system of claim 19, the ingest process being a data de-duplication ingest process, the read process being a data de-duplication read process.

\* \* \* \* \*

UNITED STATES PATENT AND TRADEMARK OFFICE
CERTIFICATE OF CORRECTION

PATENT NO.        : 9,069,702 B2
APPLICATION NO.   : 13/463430
DATED             : June 30, 2015
INVENTOR(S)       : Todd Pisek et al.

It is certified that error appears in the above-identified patent and that said Letters Patent is hereby corrected as shown below:

In the Specification:

In column 1, line 36, delete "exam pie" and insert --example--.

In column 2, line 17, delete "ingester may" and insert --ingester 134 may--.

In column 2, line 37, delete "head, 202" and insert --head 202--.

In column 2, line 48, delete "LRU supports" and insert --LRU 200 supports--.

In column 2, line 53, delete "bath" and insert --both--.

In column 2, line 66, delete "LRU, are" and insert --LRU 200, are--.

In column 2, line 66, delete "head." and insert --head 202.--.

In column 3, line 25, delete "tail of" and insert --tail 204 of--.

In column 3, line 26, delete "pages, retired" and insert --pages 212, retired--.

In column 3, line 26, delete "pages, other" and insert --pages 216, other--.

In column 3, line 27, delete "pages, and" and insert --pages 210, and--.

In column 3, line 27, delete "pages. An" and insert --pages 214. An--.

In column 3, line 27, delete "page may" and insert --page 210 may--.

In column 3, line 33, delete "Figure three" and insert --FIG. 3--.

In column 3, line 48, delete "pages may" and insert --pages 310 may--.

In column 3, line 49, delete "pages, by" and insert --pages 314, by--.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 9,069,702 B2

In the Specification:

In column 3, line 50, delete "pages, and" and insert --pages 310, and--.

In column 3, line 50, delete "pages. Recall" and insert --pages 312. Recall--.

In column 3, line 51, delete "page reaches" and insert --page 310 reaches--.

In column 3, line 54, delete "LRU towards" and insert --LRU 300 towards--.

In column 4, line 25, delete "pages that" and insert --pages 510 that--.

In column 4, line 28, delete "pages cross" and insert --pages 510 cross--.

In column 4, line 31, delete "pages cross" and insert --pages 510 cross--.

In column 4, line 36, delete "pages that" and insert --pages 510 that--.

In column 4, line 38, delete "pages cross" and insert --pages 510 cross--.

In column 4, line 51, delete "input/output" and insert --input/output.--.

In column 4, line 62, delete "protocol" and insert --protocol.--.

In column 5, line 30, delete "tree) a" and insert --tree), a--.

In column 7, line 43, delete "disk 606" and insert --disk drive 606--.

In column 7, line 45, delete "disks." and insert --disk drives--.

In column 10, line 20, delete "an, active" and insert --an active--.

In column 11, line 37, delete "MBB," and insert --AABB,--.

In the Claims:

In column 12, line 39, delete "that that" and insert --that--.

In column 12, line 60, delete "least recently used" and insert --least-recently-used--.

In column 13, line 21, delete "third selectively" and insert --third logic selectively--.

In column 14, line 8, delete "least recently used" and insert --least-recently-used--.